United States Patent [19]

Molt

[11] 4,060,513

[45] Nov. 29, 1977

[54] NICKEL ORGANOPHOSPHATE/BENZOPHENONE U.V. STABILIZERS

[75] Inventor: Kenneth Richard Molt, Cincinnati, Ohio

[73] Assignee: Cincinnati Milacron, Inc., Cincinnati, Ohio

[21] Appl. No.: 680,130

[22] Filed: Apr. 26, 1976

[51] Int. Cl.$^2$ .............................................. C08K 5/52
[52] U.S. Cl. .................. 260/45.75 N; 252/400 A; 260/45.95 F
[58] Field of Search ................. 260/45.75 N, 45.95 F; 252/400 A

[56] References Cited

U.S. PATENT DOCUMENTS

| | | | |
|---|---|---|---|
| 3,244,667 | 4/1966 | Burgess | 260/45.75 |
| 3,312,658 | 4/1967 | Kamijo et al. | 260/45.75 N |
| 3,464,953 | 9/1969 | Newland | 260/45.75 N |
| 3,536,661 | 10/1970 | Hagemeyer et al. | 260/45.85 |
| 3,607,828 | 9/1971 | Hussey | 260/45.75 N |
| 3,642,690 | 2/1972 | Mills | 260/45.75 N |
| 3,644,485 | 2/1972 | Lappin et al. | 260/475 P |
| 3,676,471 | 7/1972 | Eggensperger et al. | 260/45.95 |

*Primary Examiner*—V. P. Hoke
*Attorney, Agent, or Firm*—Donald Dunn

[57] ABSTRACT

U.V. stabilizer compositions comprising a nickel organophosphate and a benzophenone and polymer compositions of increased resistance to deterioration containing same are provided.

28 Claims, No Drawings

NICKEL ORGANOPHOSPHATE/BENZOPHENONE U.V. STABILIZERS

Background of the Invention

The present invention relates to stabilizer compositions comprising in synergistic combination 1) nickel salts of esters of phosphoric acid and 2) benzophenone. Further, this invention relates to plastic compositions comprising a polymer and as a stabilizer for said polymer a synergistic combination of 1) nickel salts of esters of phosphoric acid and 2) benzophenone.

Polyolefins enjoy widespread usage in the art. However, even with such widespread usage they are well-known to suffer disadvantages, particularly upon exposure to weather, light and heat, which reduce their usefulness. Thus, for example polypropylene is a tough, high melting thermoplastic polymer, but in several respects its outdoor stability leaves much to be desired. This polymer tends to decrease rapidly in melt viscosity and then become brittle when kept at elevated temperatures during processing on injection molding, extrusion, calendering and fiber forming equipment. The deterioration is particularly strong when the polymer is worked in the molten state in the presence of oxygen (e.g., air). The physical properties of polypropylene exhibit deterioration as a result of prolonged exposure to light, particularly sunlight and ultraviolet light. Discoloration and cracking are also well-known upon exposure of polypropylene to sunlight. Many other polyolefins (e.g., polyethylene) suffer some if not all of the deterioration properties of polypropylene upon exposure to weather, light, particularly ultraviolet light, and/or heat. It is therefore highly desirable to overcome the disadvantages of the polyolefins and thereby increase their usefulness.

Selected nickel salts have heretofore been variously proposed as stabilizers, alone or in combination with other compounds, for stabilizing polyolefins, particularly polypropylene and polyethylene. Many of these nickel salts are in themselves colored or are known to undesirably impart an initial color to the unpigmented polyolefin or to change the color of pigmented or dyed polyolefins. Thus, for example, nickel salts of phenol (Daly — U.S. Pat. No. 2,340,938), nickel salts of O-hydroxy aromatic aldehydes or carboxylic acids (Hercules Powder Company — British Patent No. 945,050) and nickel salts of aliphatic polyamines (Hercules Powder Company — British Patent No. 945,050) are known to be green while nickel salts of bis-salicylidene ethylene diamine (Burgess — U.S. Pat. No. 2,615,860) are known to be golden brown and nickel gyloxines (Belgian Patent No. 640,272) are red. In addition to the color problems, many of the organonickel compounds which have heretofore been used in the art to stabilize polyolefins also have been known to detract from the heat-stabilizing effectiveness of commonly employed heat stabilizers.

It has been proposed in the art to overcome many, if not all, of the disadvantages of the previous nickel stabilizers of the art by the use of nickel organophosphites (Kauder, U.S. Pat. No. 3,395,112 July 30, 1968 and U.S. Pat. No. 3,647,841 Mar. 7, 1972 and Kujawa et al U.S. Pat. No. 3,412,118 Nov. 19, 1968), nickel salts of esters of phosphonic acids (Kartschmaroff et al U.S. Pat. No. 3,696,135 Oct. 3, 1972 and Dix et al U.S. Pat. No. 3,821,142 June 28, 1974) and nickel complexes containing trivalent phosphorus (Hechenbleikner U.S. Pat. No. 3,661,843 May 9, 1972) as stabilizers for polyolefins. The nickel organophosphites of Kauder and the trivalent phosphorus containing nickel complexes are disclosed as stabilizing polyolefins. Nickel salts of nonaromatic phosphorothionate are disclosed in the art for stabilizing butyl rubber (Hill et al U.S. Pat. No. 2,906,731 Sept. 29, 1959) while a nickel salt of an organophosphorus compound, having sulfur linked to phosphorus, in synergistic combination with a U.V. stabilizer having a phenolic nucleus (e.g. 2-hydroxy-4-octoxybenzophenone) is disclosed in the art (Burgess U.S. Pat. No. 3,244,667 Apr. 5, 1966) for stabilizing solid olefin polymers against light and heat. Nickel derivatives of monobasic and dibasic hindered phenol substituted phosphonic acids are also known as stabilizers for polyolefins (Spivack U.S. Pat. No. 3,310,575 Mar. 21, 1967). It is to be noted that the nickel containing trivalent phosphorus and phosphorus-sulfur linked compounds of the above cited prior art are not nickel compounds which contain non-sulfur bearing pentavalent phosphorus ionically bonded to nickel through oxygen. A synergy different from the unexpected synergy of this invention and between a nickel salt of an ester of phosphoric acid and an alkyl substituted phenolic antioxidant for stabilizing polypropylene has also been disclosed in the art (Kamijo et al U.S. Pat. No. 3,312,658 Apr.4, 1967).

It is an object of this invention to provide a synergistic composition comprising a nickel salt of an ester of phosphoric acid and a benzophenone for stabilizing polyolefins. A further object of this invention is to provide a plastic composition exhibiting improved resistance to heat and/or light, more particularly ultraviolet light. A still further object is to provide a method for improving the resistance of polyolefins to heat and/or light, more particularly ultraviolet light.

SUMMARY OF THE INVENTION

It has been discovered that the aforegoing objects and others, as will be evident from the following description and claims, can be achieved by a novel synergistic combination comprising 1) nickel salt of an ester of phosphoric acid and 2) a benzophenone and by polyolefin resin compositions containing this novel synergistic combination.

The novel synergistic stabilizer compositions of this invention are especially suitable for stabilizing olefin homopolymer, olefin copolymers, mixtures of olefin homopolymers, mixtures of olefin copolymers, mixtures predominantly containing olefin homopolymer or olefin copolymer and mixtures of olefin homopolymer and olefin copolymer. The novel polyolefin compositions of this invention find utility in the making of well-known articles such as fibers and containers.

DESCRIPTION OF THE INVENTION

In accordance with this invention there is provided a) for stabilizing polyolefin resins a novel synergistic stabilizer composition comprising 1) a nickel salt of an organic ester of phosphoric acid and 2) a benzophenone selected from the group consisting of 2-hydroxybenzophenone, substituted 2-hydroxybenzophenone and mixtures thereof b) stabilized polyolefin compositions comprising a polyolefin resin and in synergistic combination a nickel salt of an organic ester of phosphoric acid and a benzophenone selected from the group consisting of 2-hydroxybenzophenone, substituted 2- hydroxybenzophenone and mixtures thereof and c) a method for stabilizing polyolefin resins comprising the step of adding to a polyolefin resin a synergistic stabilizers composition comprising 1) a nickel salt of an organic ester of phosphoric acid and 2) a benzophenone selected from the group consisting of 2-hydroxybenzophenone, substituted 2-hydroxybenzophenone and mixtures thereof.

The nickel salts of organic esters of phosphoric acid employed in this invention include compounds having the following general formulae:

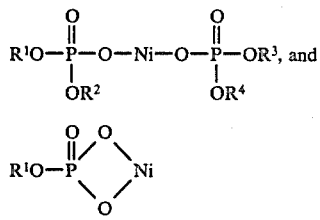

wherein $R^1$, $R^2$, $R^3$ and $R^4$ are the same or different and are alkyl, aryl, cycloalkyl, aralkyl or alkaryl monovalent radicals. Examples of nickel salts of organic esters of phosphoric acid which are usable in the practice of this invention include but are not limited to nickel monoethyl phosphate, nickel diethyl phosphate, nickel monopropyl phosphate, nickel dipropyl phosphate, nickel monobutyl phosphate, nickel dibutyl phosphate, nickel monohexyl phosphate, nickel dihexyl phosphate, nickel monoisobutyl phosphate, nickel diisobutyl phosphate, nickel monitertiary butyl phosphate, nickel mono 2-ethylhexyl phosphate, nickel di 2-ethyl hexyl phosphate, nickel mono n-octyl phosphate, nickel di n-octyl phosphate, nickel mono decyl phosphate, nickel didecyl phosphate, nickel mono octadecyl phosphate, nickel di octadecyl phosphate, nickel mono lauryl phosphate, nickel dilauryl phosphate, nickel monophenyl phosphate, nickel diphenyl phosphate, nickel mono cyclohexyl phosphate, nickel di cyclohexyl phosphate, nickel mono tolyl phosphate, nickel mono benzyl phosphate, nickel dibenzyl phosphate, nickel mono (butylphenyl) phosphate, nickel di(butylphenyl) phosphate, nickel mono(octylphenyl) phosphate, nickel di(isooctylphenyl) phosphate, nickel monostearyl phosphate, nickel distearyl phosphate, nickel mono(phenylethyl) phosphate, nickel di(phenylethyl) phosphate, nickel monooleyl phosphate, nickel ethyl, butyl phosphate, nickel propyl, octyl phosphate, nickel ethyl, phenyl phosphate, nickel butyl, benzyl phosphate and nickel octyl, cyclohexyl phosphate. In the nickel salt compounds usable in the practice of this invention the nickel is ionically linked to pentavalent phosphorus through oxygen. Further, the nickel salt compounds of this invention have four oxygen atoms each linked to the same pentavalent phosphorus atom. The alkyl radical in the nickel compounds usable in this invention may contain from 1 to 30 carbon atoms, preferably from 1 to 18 carbon atoms, may be straight or branched chain, may be saturated or unsaturated and may contain heteroatoms (e.g., oxygen and sulfur). In the practice of this invention the aryl radical of the nickel salt compound may contain from 5 to 12, preferably 5 to 6 carbon atoms, the cycloalkyl radical of the nickel salt compound may preferably contain 5 to 6 carbon atoms, the aralkyl and alkaryl radicals of the nickel compound may contain from 6 to 40, preferably 6 to 24 carbon atoms.

Mixtures of nickel salts of esters of phosphoric acid may be used in the practice of this invention.

The nickel salts of organic esters of phosphoric acid as are used in the practice of this invention may be prepared by methods well-known in the art as for example: a mono organo ester of phosphoric acid or di organo ester of phosphoric acid (one equivalent based on acid value) is added to aqueous sodium hydroxide (1 mole NaOH) at 20°-30° C and to this mixture is then added nickel sulfate (0.5 moles) with stirring whereupon after one hour of stirring the precipitated nickel salt of the organophosphate (i.e., the nickel salt of the ester of phosphoric acid) is filtered off, washed with water and dried to constant weight.

In accordance with the novel stabilizer and resin compositions of this invention there is employed in synergistic combination with the nickel salts of organic esters of phosphoric acid an unsubstituted or substituted 2-hydroxybenzophenone or mixtures of unsubstituted and substituted 2-hydroxybenzophenones. Such unsubstituted or substituted 2-hydroxybenzophenones may be described by the following general formula:

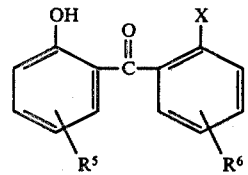

where X is hydroxyl or nothing, both or either of $R^5$ and $R^6$ are nothing or the same or different straight or branched chain alkyl or alkoxy radical of 1 to 20 carbon atoms and either of $R^5$ and $R^6$ but not both $R^5$ and $R^6$ may be bromine, chlorine or fluorine. With reference to formula II examples of unsubstituted or substituted 2-hydroxybenzophenones usable in the practice of this invention include but are not limited to, where

| X | $R^5$ | $R^6$ |
|---|---|---|
| OH | — | — |
| OH | 4-methyl | — |
| — | 4-methyl | — |
| OH | 4-methyl | 4'-methyl |
| — | 4-octyl | — |
| OH | 4-octadecyl | 4'-octadecyl |
| — | 5-methyl | — |
| OH | — | 5'-methyl |
| OH | 6-hexyl | 5'-hexyl |
| — | 5-octyl | 4'-butyl |
| OH | 3-methyl | 3'-methyl |
| — | 5-dodecyl | 5'-dodecyl |
| — | 4-ethyl | 3'-chloro |
| OH | 3-propyl | 5'-isobutyl |
| — | 4-methoxy | — |
| — | 5-propoxy | — |
| — | 6-butoxy | — |
| — | 3-isobutoxy | — |
| — | 4-octoxy | — |
| — | 5-isooctoxy | — |
| — | 4-decyloxy | — |
| — | 5-dodecyloxy | — |
| — | 4-octadecyloxy | — |
| — | 4-eicosyloxy | — |
| OH | 3-methoxy | — |
| OH | 5-butoxy | — |
| OH | 4-octoxy | — |
| OH | 4-isooctoxy | — |
| OH | 4-tridecyloxy | — |
| OH | 4-octadecyloxy | — |
| — | 3-methoxy | 3'-methoxy |
| — | 6-butoxy | 5'-butoxy |
| — | 4-octoxy | 4'-octoxy |
| — | 5-decyloxy | 5'-decyloxy |
| — | 6-methoxy | 6'-butoxy |
| — | 6-ethoxy | 4'-decyloxy |
| — | 4-decyloxy | 4'-octadecyloxy |
| OH | 4-methoxy | 5'-methoxy |

-continued

| | | |
|---|---|---|
| OH | 5-butoxy | 5'-butoxy |
| OH | 5-methoxy | 6'octoxy |
| OH | 4-octoxy | 4'-octoxy |
| OH | 5-propoxy | 4' tridecyloxy |
| OH | 4-decyloxy | 4'-dodecyloxy |
| OH | 5-butoxy | 4'-octadecyloxy |
| — | 4-Cl | — |
| — | — | 4'-Cl |
| OH | 4-Cl | — |
| OH | — | 4'Cl |
| — | 5-Br | — |
| — | — | 6'-Br |
| OH | 4-Br | — |
| — | — | 4'-F |
| OH | 6-F | — |
| — | 4-Cl | 4'-methoxy |
| — | 5-butoxy | 5'-Cl |
| OH | 4-Br | 4'-octoxy |
| OH | 5-decyloxy | 4'-Br |
| OH | 5-F | 5'-octadecyloxy |
| OH | 4-isooctoxy | 6'-F |
| — | 6-Br | 4'-hexadecyloxy |

Although 2-hydroxybenzophenone and various substituted 2-hydroxybenzophenones are usable in the practice of this invention, as regards the substituted 2-hydroxybenzophenones it is preferred to use 2,2'-dihydroxybenzophenone, 2-hydroxy-4-alkoxy benzophenone, 2,2'-dihydroxy-4-alkoxybenzophenone, 2-hydroxy-4-4'-dialkoxybenzophenone or 2,2'-dihydroxy-4,4'-dialkoxybenzophenone.

In accordance with this invention there is provided stabilized polyolefin compositions comprising 1) a polyolefin resin and 2) a stabilizing effective amount of a stabilizer comprising in synergistic combination a nickel salt of an organic ester of phosphoric acid and a benzophenone selected from the group consisting of 2-hydroxybenzophenone, substituted 2-hydroxybenzophenone and mixtures thereof The terms polyolefin, olefin polymer and polyolefin resin as used in the context of this disclosure have the same meaning and are employed interchangeably herein. There may be used as the olefin polymer in the practice of this invention olefin homopolymers such as but not limited to polyethylene, polypropylene, polybutene and polybutadiene, olefin copolymers such as but not limited to ethylene propylene copolymers (e.g., 50:50, 80:20 and 20:80), ethylene-monoolefin copolymers wherein the monoolefin has 4-10 carbon atoms and is present in a minor amount, e.g., ethylene-butene-1 copolymer (95:5) and ethylenedecene-1 copolymer (90:10). Furthermore, they can be used to stabilize natural rubber, styrene-butadiene rubber (SBR rubber), e.g., (75% butadiene, 25% styrene) and EPDM rubbers and acrylonitrile-butadiene styrene terpolymers (ABS).

As to the EPDM rubber, there can be employed many of the commercially available EPDM rubbers. The EPDM rubber normally contains 30 to 70 molar percent (preferably 50 to 60 molar percent) of ethylene, 65 to 20 molar percent (preferably 35 to 45 molar percent propylene) and 1 to 15 molar percent (preferably 3 to 5 molar percent) of the nonconjugated polyolefin. Usually, the polyolefin is not over 10 molar percent. The ethylene and propylene can each be 5 to 95 molar percent of the composition.

As used in the present specification and claims the term polyolefin includes aliphatic unconjugated polyene hydrocarbons and cyloaliphatic nonconjugated polyene hydrocarbons, e.g., endocyclic dienes. Specific examples of suitable nonconjugated polyolefins include pentadiene-1,4; hexadiene-1,4; dicyclopentadiene, methyl cyclopentadiene dimer, cyclododecatriene, cyclooctadiene-1,5; 5-methylene-2-norbornene.

Specific examples of suitable terpolymers are the Royalenes which contain 55 mole percent ethylene, 40 to 42 mole percent propylene and 3 to 5 mole percent dicyclopentadiene; Enjay terpolymers, e.g., ERP-404 of Enjay and Enjay 3509 which contains about 55 mole percent ethylene, 41 mole percent propylene and 4 mole percent 5-methylene-2-norbornene; Nordel, a terpolymer of 55 mole percent ethylene, 40 mole percent propylene and 5 mole percent hexadiene-1,4. Another suitable terpolymer is the one containing 50 mole percent ethylene, 47 mole percent propylene and 3 mole percent, 1,5-cyclooctadiene (dutrel).

Examples of EPDM rubbers are given in U.S. Pat. Nos. 2,933,480; 3,000,866; 3,063,973; 3,093,620; 3,093,621; and 3,136,739, in British Pat. 880,904 and in Belgian Pat. 623,698.

Terpolymers and other EPDM rubbers from ethylene, propylene and dicyclopentadiene are exemplified in Tarney U.S. Pat. No. 3,000,866; Adamek 3,136,739 and Dunlop (British) Pat. 880,904. EPDM rubbers from ethylene, propyiene and 1,4-hexadiene are exemplified in Gresham et al U.S. Pat. No. 2,933,480. As in Gresham et al other suitable nonconjugated diolefins are 1,4-pentadiene; 2-methyl-1,5 hexadiene 3,3-dimethyl-1,5-hexadiene, 1,7-octadiene, 1,9-decadiene, 1,19-eicosadiene, 1,9-octadecadiene, 6-methyl 1,5-heptadiene, methyl-1,6-octadiene, 11-ethyl-1,11-tridecadiene.

EPDM rubbers from ethylene, propylene and 5-methyl 2-norbornene are exemplified in U.S. Pat. No. 3,093,621. Suitable norbornadienes e.g. 2-methyl norbornadiene, 2-ethyl norbornadiene, 2-n-heptyl norbornadiene are shown in Glading U.S. Pat. No. 3,063,973 and bicyclo compounds such as bicyclo (2,2,2) heptadiene-2,5 are shown in Dunlop (British) Pat. 880,904. The use of cyclooctadiene-1,5 and other cyclodienes is shown in Montecatini (Belgium) Pat. 523,698. Thus, there can be use in making the EPDM elastomer 1,4-cycloheptadiene, 1,4-cyclooctadiene, 1,6-cyclodecadiene, 1,5-cyclododecadiene, 1,7-cyclodecadiene, 1,5,9-cyclododecatriene, 1-methyl-1,5-cyclooctadiene.

There may be used in the practice of this invention mixtures of olefin homopolymer such as for example mixtures of polyethylene and polypropylene, mixtures of olefin copolymers such as a mixture of an 80:20 ethylene: propylene copolymer and a 95:5 ethylene: butene-1 copolymer and mixtures of olefin homopolymer and olefin copolymer as for example a mixture of polypropylene and a 95:5 ethylene: butene-1 copolymer. Polymer blends in which an olefin homopolymer or olefin copolymer is the major polymeric constituent can be used in the practice of this invention.

In the novel stabilizer compositions of this invention, the weight ratio of the nickel salt of an ester of phosphoric acid to the 2-hydroxybenzophenone, substituted 2-hydroxybenzophenone or mixture thereof may vary from 90:10 to 10:90, preferably from 75:25 to 25:75.

There may be employed in the practice of the novel stabilized polyolefin compositions of this invention from 0.05 to 3.0 preferably 0.05 to 2.5, parts by weight per 100 parts by weight of the polyolefin resin of the synergistic combination of a nickel salt of an ester of phosphoric acid and a benzophenone selected from the group consisting of 2-hydroxy benzophenone, substituted 2-hydroxybenzophenone and mixtures thereof. The 2-hydroxybenzophenone and substituted 2- hydroxy benzophenones usable in the practice of this invention may be represented by the formula

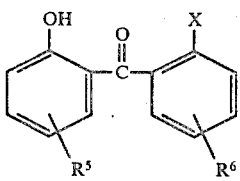

wherein X, $R^5$ and $R^6$ are the same as previously defined herein.

It is well-known in the art to employ various materials to improve the processability, strength and appearance of polyolefin resins and articles made therefrom. Among such materials are antioxidants, processing aids, lubricants, release agents, fillers, pigments and dyes. These materials may in the customary amounts well-known in the art be employed in the novel polyolefin composition of this invention.

In the practice of this invention there may be additionally employed heat stabilizers well-known in the art which include, for instance phenols, thiodipropionic esters, polyvalent metal salts of organic acids, organic mercaptans and organic polysulfides.

Wherein it is desired to employ phenolic stabilizers they can contain one or more phenolic hydroxyl groups, and can contain one or more phenolic nuclei. In addition, the phenolic nucleus can contain an oxy or thio ether group.

The alkyl-substituted phenols and polynuclear phenols, because of their molecular weight, have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatibility with polypropylene inasmuch as the phenolic compound then acquires more of an aliphatic hydrocarbon character, and therefore there is no upper limit on the number of alkyl carbon atoms. Usually, from the standpoint of availability, the compound will not have more than about eighteen carbon atoms in an alkyl, alicyclidene and alkylene group, and a total of not over about fifty carbon atoms. The compounds may have from one to four alkyl radicals per phenol nucleus.

Examples of monohydric phenols include 2,6-ditertiary-butyl-4-methyl phenol, 2-tertiary-butyl-4-methoxy phenol, nonyl phenol, dodecyl phenol, dinonyl phenol, phenyl phenol, tetradecyl phenol, and tetrahydro-a-naphthol.

Exemplary polyhydric phenols are orcinol, propyl gallate, catechol, resorcinol, 4-octyl resorcinol, 4-dodecyl resorcinol, 4-octadecyl catechol, 4-isooctyl-phloroglucinol, pyrogallol, hexahydroxy benzene, 4-isohexyl-catechol, 2,6-ditertiary-butyl resorcinol, 2,6-diisopropyl-phloro-glucinol, methylenebis-(2,6-ditertiarybutyl - m - cresol), methylenebis-(2,6-ditertiarybutyl-phenol), 2,2-bis(4-hydroxyphenyl) propane, methylenebis (p-cresol), 4,4'-thio-bis-phenol, 4-4'-oxobis-(3-methyl - 6 - isopropyl-phenol), 4,4'-thiobis(3-methyl-6-tertiary-butyl-phenol), 2,2'-oxobis(4-dodecylphenol), 2,2'-thiobis (4-methyl-6-tertiary-butyl-phenol), 2,6-diisooctyl resorcinol, 4,4'-n-butylidenebis(2-tertiarybutyl-5-methyl-phenol), 4,4'-benzylidenebis(2-tertiarybutyl-5-methyl-phenol), 2,2'-methylenebis (4 - methyl-6-(1'-methyl-cyclohexyl)-phenol), 4,4'-cyclohexylidene-bis(2-tertiarybutylphenol), 2,6 - bis(2'-hydroxy-3'-tertiarybutyl-5'-methylbenzyl)-4-methyl-phenol, 4-octyl pyrogallol, and 3,5-ditertiarybutyl catechol.

As examples of the thiodipropionic acid esters which may be used, there can be mentioned the following: monolauryl thiodipropionic acid, dilauryl thiodipropionate, butyl stearyl thiodipropionate, di(2-ethylbenzyl)-thiodipropionate, diisodecyl - thiodipropionate, isodecyl phenyl thiodipropionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soybean oil fatty alcohols and thiodipropionic acid, cyclohexyl thiodipropionate, monooleyl thiodipropionic acid, hydroxyethyl lauryl thiodipropionate, monoglyceryl thiodipropionic acid, glyceryl monostearate monothiodipropionate, sorbitol isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecylbenzyl thiodipropionate, and mono(dodecylbenzyl) thiodipropionic acid.

When there is used a polyvalent metal salt of an organic acid, the organic acid will ordinarily have from about 6 to about 24 carbon atoms. The polyvalent metal usually can be any metal of Group II of the Periodic Table, such as zinc, calcium, cadmium, barium, magnesium and strontium. The acid may be any organic nonnitrogeneous monocarboxylic acid having from 6 to 24 carbon atoms. The aliphatic, aromatic, alicyclic and oxygen-containing heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood any cyclic acid in which the ring is nonaromatic and composed solely of carbon atoms, and such acids may have inert, nonreactive substituents such as halogen, hydroxyl, alkyl radicals, alkenyl radicals and other carbocyclic ring structures condensed therewith. The oxygen-containing heterocyclic compounds can be aromatic or nonaromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

Among the acids which can be used in the form of their metal salts there can be mentioned the following: hexoic acid, 2-ethylhexoic acid, n-octoic acid, isooctoic acid, capric acid, undecylic acid, lauric acid, myristic acid, palmitic acid, margaric acid, stearic acid, oleic acid, ricinoleic acid, behenic acid, chlorocaproic acid, hydroxy capric acid, benzoic acid, phenylacetic acid, butyl benzoic acid, ethyl benzoic acid, propyl benzoic acid, hexyl benzoic acid, salicyclic acid, napthoic acid, 1-naphthalene acetic acid, orthobenzoyl benzoic acid, naphthenic acids derived from petroleum, abietic acid, dihydroabetic acid, hexahydrobenzoic acid, and methyl furoic acid.

Various blending or mixing methods and apparatus may be used in the practice of this invention. Thus, the synergistic stabilizer compositions of this invention may be prepared by mixing together the nickel salt of an organic ester of phosphoric acid and a substituted or unsubstituted 2-hydroxybenzophenone in a manner and by techniques well-known in the art. Techniques such as dry blending on conventional mixers and solvent blending are but examples of methods well-known in the art which can be used in the practice of this invention. It is not critical which material is added to which material in the practice of the synergistic stabilizer compositions of this invention. Thus, the nickel salt of an ester of phosphoric acid may be added to a substituted or unsubstituted 2-hydroxybenzophenone or conversely the substituted or unsubstituted 2-hydroxybenzophenone may be added to the nickel salt of an ester of phosphoric acid.

The polyolefin compositions of this invention may be prepared by methods and using apparatus well-known in the art. Dry blending in a blender such as a Henschel blender and blending on a two roll mill are examples of techniques, well-known in the art, which may be used in the preparation of the polyolefin compositions of this invention. It is not critical in what manner the synergistic stabilizer composition of this invention is added to the polyolefin resin. Thus, for example, the nickel salt of an ester of phosphoric acid and the substituted or unsubstituted 2-hydroxybenzophenone may first be mixed together and then the resulting mixture added to the polyolefin resin or the nickel salt of an ester of phosphoric acid and the substituted or unsubstituted 2-hydroxybenzophenone may individually be added to the polyolefin resin independently of which is added first and their not having been previously mixed together.

It is highly desirable in the polyolefin art to employ stabilizers which in themselves impart very little or no initial color to the resin when incorporated therein. The synergistic stabilizer compositions of this invention are therefore to be recognized to be advantageous in this regard. Very little, if indeed any, perceptable initial color, has been found to have been imparted to polypropylene or polyethylene by synergistic stabilizer compositions of this invention. Additionally, the polyolefin compositions of this invention advantageously exhibit very little, if any, initial color resulting from the presence therein of the synergistic stabilizer compositions of this invention.

Another advantage of the synergistic stabilizer compositions of this invention is to be found in their ability to advantageously enhance the dye receptivity of polypropylene and polyethylene and hence polyolefins. This is of particular importance in view of the large consumption of dyed polypropylene and polyethylene fibers. Further, the polyolefin composition of this invention advantageously possess enhanced dye receptivity and thereby increased utility.

This invention and the practice thereof is further described by the following nonlimiting examples in which all proportions, ratios, concentrations and percentages are by weight, all weights are in grams and all temperatures are in ° C (centigrade) unless otherwise indicated.

EXAMPLES 1-32

Stabilizer Tests in Polypropylene

A commercial sample of crystalline polypropylene (Hercules Profax 6501) was thoroughly mixed with 0.05% tetrakis [methylene (3,5-di-tert-butyl-4-hydroxyhydrocinnamate)] methane (Irqanox 1010), 0.15% distearylthiodipropionate and varying levels of stabilizer. Mixing was continued on a 2-roll mill at 340° F for 10 minutes. The resulting sheet was compression molded at 350° F for 8 minutes. The molded squares (30 mils thick) were annealed for 10 minutes at 300° F, cut into strips and placed in a Twin Arc Atlas Weather-O-meter. Specimens were removed at 25 hour intervals (100 hour intervals for high levels of stabilizer) and subjected to a 180° bending test to determine embrittlement. The test was terminated after 2 consecutive breaks. The results of the test and further details as to composition are given in Table I.

TABLE I

Tests In Polypropylene

| Examples | Stabilizer | Concentration Parts Per Hundred Resin | Weather-O-meter Hours to Failure |
|---|---|---|---|
| 1 | None | 0 | 50.0 |
| 2 | 50% nickel monooctylphosphate, 50% nickel dioctylphosphate | 0.5 | 400.0 |
| 3 | 2-hydroxy-4-octoxybenzophenone | 0.5 | 400.0 |
| 4 | 50-50 mixture of 2 and 3 | 0.5 | 900.0 |
| 5 | 25-75 mixture of 2 and 3 | 0.5 | 725.0 |
| 6 | 75-25 mixture of 2 and 3 | 0.5 | 750.0 |
| 7 | 10-90 mixture of 2 and 3 | 0.5 | 575.0 |
| 8 | 90-10 mixture of 2 and 3 | 0.5 | 550.0 |
| 9 | 50-50 mixture of 2 and 3 | 0.05 | 150.0 |
| 10 | Example 2 | 0.05 | 75.0 |
| 11 | Example 3 | 0.05 | 75.0 |
| 12 | 50-50 mixture of 2 and 3 | 2.5 | 1050.0 |
| 13 | Example 2 | 2.5 | 600.0 |
| 14 | Example 3 | 2.5 | 575.0 |
| 15 | 2-hydroxy-4-methoxybenzophenone | 0.5 | 300.0 |
| 16 | 2-hydroxy-4-dodecoxy-benzophenone | 0.5 | 400.0 |
| 17 | 50-50 mixture of 15 and 2 | 0.5 | 725.0 |
| 18 | 50-50 mixture of 16 and 2 | 0.5 | 800.0 |
| 19 | 50% nickel monolaurylphosphate, 50% dilaurylphosphate | 0.5 | 300.0 |
| 20 | 50-50 mixture of 19 and 3 | 0.5 | 750.0 |
| 21 | 25-75 mixture of 19 and 3 | 0.5 | 625.0 |
| 22 | 75-25 mixture of 19 and 3 | 0.5 | 575.0 |
| 23 | 50% nickel monophenylphosphate, 50% nickel diphenyl phosphate | 0.5 | 375.0 |
| 24 | 50-50 mixture of 23 and 3 | 0.5 | 825.0 |
| 25 | 25-75 mixture of 23 and 3 | 0.5 | 675.0 |
| 26 | 75-25 mixture of 23 and 3 | 0.5 | 600.0 |
| 27 | Nickel monooctyl phosphate | 0.5 | 450.0 |
| 28 | Nickel dioctyl phosphate | 0.5 | 350.0 |
| 29 | 50-50 mixture of 27 and 3 | 0.5 | 950.0 |
| 30 | 50-50 mixture of 28 and 3 | 0.5 | 875.0 |
| 31 | 50-50 mixture of nickel monooctyl phenyl phosphate and 3 | 0.5 | 850.0 |
| 32 | 50-50 mixture of nickel mono tert butyl phenyl phosphate and 3 | 0.5 | 900.0 |

EXAMPLES 33-54

Stabilizer Tests in Polyethylene

A commercial sample of high density polyethylene (Phillips BMNTR-880) was milled at 280° F for 10 minutes with 0.02% Irganox 1010, 0.06% distearylthiodipropionate and varying levels of stabilizer. Molded into a 30 mil thick square, the specimen was annealed, cut into strips and exposed in the Twin Arc Weather-O-meter. Specimens were removed at 25 hour intervals (100 hour intervals for high levels of stabilizer) and subjected to a 180° bending test. The exposure test was terminated after 2 consecutive breaks. The results of the test and further details as to composition are given in Table II.

TABLE II

| | | Tests in Polyethylene Concentration Parts Per Hundred Resin | Weather-O-meter Hours to Failure |
|---|---|---|---|
| Example | Stabilizer | | |
| 33 | None | 0 | 75.0 |
| 34 | Example 2 | 0.5 | 425.0 |
| 35 | Example 3 | 0.5 | 400.0 |
| 36 | Example 4 | 0.5 | 925.0 |
| 37 | Example 5 | 0.5 | 700.0 |
| 38 | Example 6 | 0.5 | 725.0 |
| 39 | Example 7 | 0.5 | 600.0 |
| 40 | Example 8 | 0.5 | 625.0 |
| 41 | Example 9 | 0.5 | 175.0 |
| 42 | Example 10 | 0.5 | 75.0 |
| 43 | Example 11 | 0.5 | 100.0 |
| 44 | Example 12 | 2.5 | 1100.0 |
| 45 | Example 13 | 2.5 | 625.0 |
| 46 | Example 14 | 2.5 | 600.0 |
| 47 | Example 15 | 0.5 | 325.0 |
| 48 | Example 16 | 0.5 | 425.0 |
| 49 | Example 17 | 0.5 | 750.0 |
| 50 | Example 18 | 0.5 | 800.0 |
| 51 | Example 19 | 0.5 | 350.0 |
| 52 | Example 20 | 0.5 | 800.0 |
| 53 | Example 23 | 0.5 | 400.0 |
| 54 | Example 24 | 0.5 | 850.0 |

What is claimed is:

1. A polyolefin resin composition comprising 1) a polyolefin resin and 2) a stabilizingly effective amount of a stabilizer consisting essentially of in synergistic combination A) a nickel salt of an organic ester of phosphoric acid having the following general formulae

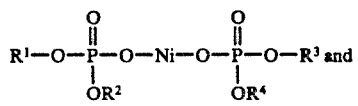 I(a)

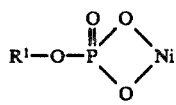 I(b)

and B) a benzophenone selected from the group consisting of unsubstituted and substituted 2-hydroxybenzophenone and mixtures thereof and having the general formula

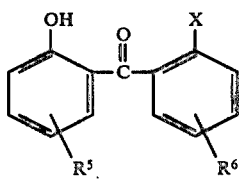 II wherein $R^1$, $R^2$, $R^3$ and $R^4$ are the same or different and are alkyl, aryl, cycloalkyl, aralkyl or alkaryl radicals, X is hydroxyl or nothing and both or either $R^5$ and $R^6$ are nothing or the same or different straight or branched chain alkyl or alkoxy radical of 1 to 20 carbon atoms or either $R^5$ and $R^6$ but not both $R^5$ and $R^6$ are bromine, chlorine or fluorine.

2. A polyolefin resin composition according to claim 1, wherein the weight ratio of the nickel salt of an organic ester of phosphoric acid to said benzophenone is from 90:10 to 10:90.

3. A polyolefin resin composition according to claim 2, wherein the weight ratio is from 75:25 to 25:75.

4. A polyolefin composition according to claim 2 wherein the amount of the stabilizer is from 0.05 to 3.0 parts by weight per 100 parts by weight of polyolefin resin.

5. A polyolefin resin composition according to claim 1 wherein the nickel salt of an organic ester of phosphoric acid is represented by formula I(a).

6. A polyolefin resin composition according to claim 1, wherein the nickel salt of an organic ester of phosphoric acid is represented by formula I(b).

7. A polyolefin resin composition according to claim 5, wherein $R^1$, $R^2$, $R^3$ and $R^4$ are alkyl radicals of 1 to 18 carbon atoms.

8. A polyolefin resin composition according to claim 6, wherein $R^1$ is an alkyl radical of 1 to 18 carbon atoms.

9. A polyolefin resin composition according to claim 1, wherein $R^1$, $R^2$, $R^3$ and $R^4$ are aryl radicals.

10. A polyolefin resin composition according to claim 1, wherein the benzophenone is 2-hydroxybenzophenone.

11. A polyolefin resin composition according to claim 1, wherein the benzophenone is a substituted 2-hydroxybenzophenone.

12. A polyolefin resin composition according to claim 11, wherein there is employed as the substituted 2-hydroxybenzophenone an alkoxy substituted 2-hydroxybenzophenone in which the alkoxy group contains 1 to 20 carbon atoms.

13. A polyolefin resin composition according to claim 12, wherein the alkoxy substituted 2-hydroxybenzophenone is 2-hydroxy-4-octoxybenzophenone.

14. A polyolefin resin composition according to claim 1, wherein the polyolefin resin is member of the group consisting of homopolymers, copolymers, mixtures of homopolymers, mixtures of copolymers and mixtures of homopolymers and copolymers of monoolefinic polymerizable monomers.

15. A polyolefin resin composition according to claim 14, wherein the polyolefin resin is polyethylene.

16. A polyolefin resin composition according to claim 14, wherein the polyolefin resin is polypropylene.

17. A stabilizer composition for stabilizing polyolefin resins consisting essentially of in synergistic combination 1) a nickel salt of an organic ester of phosphoric acid having the following general formulae

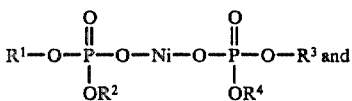 I(a)

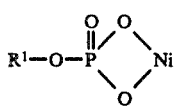 I(b)

and 2) a benzophenone selected from the group consisting of unsubstituted and substituted 2-hydroxybenzophenone and mixtures thereof and having the general formula

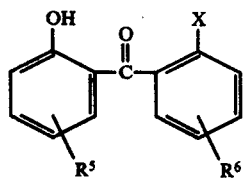

II wherein $R^1$, $R^2$, $R^3$ and $R^4$ are the same or different and are alkyl, aryl, cycloalkyl, aralkyl or alkaryl radicals, X is hydroxyl or nothing and both or either $R^5$ and $R^6$ are nothing or the same or different straight or branched chain alkyl or alkoxy radical of 1 to 20 carbon atoms or either of $R^5$ and $R^6$ but not both of $R^5$ and $R^6$ are bromine, chlorine or fluorine.

18. A stabilizer composition according to claim 17, wherein the weight ratio of the nickel salt of an organic ester of phosphoric acid to said benzophenone is in the range of from 90:10 to 10:90.

19. A stabilizer composition according to claim 18, wherein the weight ratio is from 75:25 to 25:75.

20. A stabilizer composition according to claim 17, wherein the nickel salt of an organic ester of phosphoric acid has the formula I(a).

21. A stabilizer composition according to claim 17, wherein the nickel salt of an organic ester of phosphoric acid has the formula I(b).

22. A stabilizer composition according to claim 20, wherein $R^1$, $R^2$, $R^3$ and $R^4$ are alkyl radicals of 1 to 18 carbon atoms.

23. A stabilizer composition according to claim 21, wherein $R^1$ is an alkyl radical of 1 to 18 carbon atoms.

24. A stabilizer composition according to claim 17, wherein $R^1$, $R^2$, $R^3$ and $R^4$ are aryl radicals.

25. A stabilizer composition according to claim 17, wherein there is employed an unsubstituted 2-hydroxybenzophenone.

26. A stabilizer composition according to claim 17, wherein there is employed a substituted 2-hydroxybenzophenone.

27. A stabilizer composition according to claim 26, wherein there is employed an alkoxy substituted 2-hydroxybenzophenone in which the alkoxy group contains from 1 to 20 carbon atoms.

28. A stabilizer composition according to claim 27, wherein the alkoxy substituted 2-hydroxybenzophenone is 2-hydroxy-4-octoxybenzophenone.

* * * * *

UNITED STATES PATENT OFFICE
CERTIFICATE OF CORRECTION

PATENT NO. : 4,060,513
DATED : November 29, 1977
INVENTOR(S) : Kenneth Richard Molt It is certified that error appears in the above-identified patent and that said Letters Patent are hereby corrected as shown below:

Assignee: "Cincinnati Milacron, Inc., Cincinnati, Ohio" corrected to read -- Cincinnati Milacron Chemicals, Inc., Reading, Ohio -- .

Signed and Sealed this

Twenty-third Day of May 1978

[SEAL]

Attest:

RUTH C. MASON
Attesting Officer

LUTRELLE F. PARKER
Acting Commissioner of Patents and Trademarks